United States Patent
Wu et al.

(10) Patent No.: US 10,045,053 B1
(45) Date of Patent: Aug. 7, 2018

(54) FRAGMENT INSERTION FOR LIVE MEDIA STREAMS

(71) Applicant: Amazon Technologies, Inc., Seattle, WA (US)

(72) Inventors: Yongjun Wu, Bellevue, WA (US); Amarsingh Buckthasingh Winston, Seattle, WA (US); Gaurav Saxena, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/684,152

(22) Filed: Aug. 23, 2017

(51) Int. Cl.
| | |
|---|---|
| *H04N 7/10* | (2006.01) |
| *H04N 7/025* | (2006.01) |
| *H04N 21/2187* | (2011.01) |
| *H04N 7/00* | (2011.01) |
| *H04N 21/6379* | (2011.01) |

(52) U.S. Cl.
CPC ......... *H04N 21/2187* (2013.01); *H04N 7/007* (2013.01); *H04N 21/6379* (2013.01)

(58) Field of Classification Search
CPC combination set(s) only.
See application file for complete search history.

(56) References Cited

U.S. PATENT DOCUMENTS

| | | | |
|---|---|---|---|
| 2009/0044217 A1* | 2/2009 | Lutterbach | H04H 20/103 725/34 |
| 2012/0137015 A1* | 5/2012 | Sun | H04N 21/26258 709/231 |
| 2013/0205332 A1* | 8/2013 | Martin | H04N 21/00 725/32 |
| 2017/0289228 A1* | 10/2017 | Romrell | H04L 65/605 |

* cited by examiner

*Primary Examiner* — Alexander Gee
(74) *Attorney, Agent, or Firm* — Weaver Austin Villeneuve & Sampson LLP

(57) ABSTRACT

Techniques are described for enabling the insertion of semi-targeted content in live content streams consumed by devices that do not support unconstrained dynamic fragment insertion.

20 Claims, 3 Drawing Sheets

FRAGMENT INSERTION FOR LIVE MEDIA STREAMS

BACKGROUND

Live media content includes channels or feeds with scheduled content (e.g., premium movie channels) as well as live broadcasts (e.g., sporting events, news, etc.). Unlike video-on-demand (VOD) content, live content may not have a distinct end point and may continue indefinitely. In addition, VOD content may be buffered or otherwise stored in client devices well in advance of the client playhead (i.e., the content fragment currently being rendered by the client). This is typically not the case for live content because of the fact that the delay between the live playhead (i.e., the latest content fragment available) and the client playhead may be only a few seconds, as well as the fact that the live content is often generated in real time and therefore may not yet exist.

Media streaming devices use a variety of media players to play back media content. Media streaming devices typically receive periodic firmware and software updates that can include updates to the latest streaming techniques. While many streaming devices remain up to date, not all streaming devices receive or install the latest updates, and as such, many streaming devices are unable to support the latest streaming techniques, for instance, dynamic fragment insertion.

DETAILED DESCRIPTION

This disclosure describes techniques for enabling the insertion of semi-targeted content in live content streams consumed by devices that do not support unconstrained dynamic fragment insertion. Unconstrained dynamic fragment insertion allows for each client device to receive personalized manifest data, which can include targeted advertisement content to the user of that client (e.g., advertisements based on personal shopping habits). For client devices that do not support dynamic fragment insertion, instead of receiving personalized advertisement content, unsupported client devices are categorized according to a more general device characteristic (e.g., geographic location). When such a client device requests playback of live content, they receive manifest data that includes semi-targeted advertisement corresponding to a characteristic of that device (e.g., client devices in Nebraska). As such, client devices that would otherwise be unable to receive targeted advertisement may now receive such content according to the techniques disclosed herein. An example may be instructive.

Figure 1:
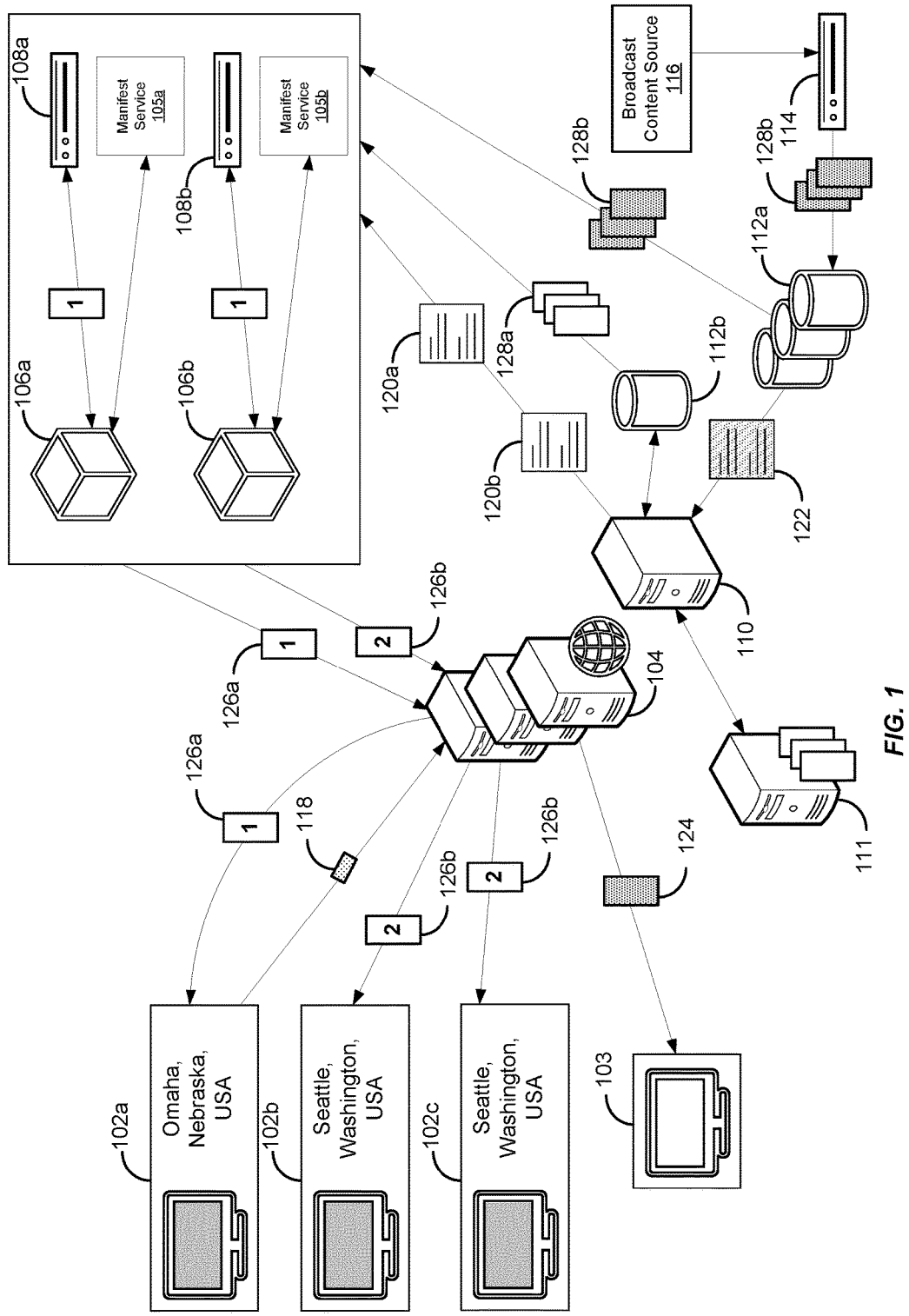
FIG. 1 illustrates an example of fragment insertion for live media streaming.

FIG. 1 illustrates an example of fragment insertion for live media streams. As shown in FIG. 1, client devices 102*a*-102*c* and client device 103 are some of many client devices streaming live media content from CDN 104. Client devices 102*a*-102*c* are examples of client devices that do not support playback of media content with dynamic fragment insertion, while client device 103 is a client device that does support playback of media content with dynamic fragment insertion. Client device 102*a* sends playback request 118 to CDN 104 in order to request playback of live media content (e.g., a live football game). Playback request 118 includes a uniform resource locator (URL) to client manifest data. After CDN 104 receives request 118, a server of CDN 104 identifies the client manifest data using the URL. In this case, the URL points to client manifest data representing playback options of fragments for the live football game and advertisement content for client devices in Nebraska. Whereas for client devices 102*b* and 102*c*, CDN 104 provides client manifest data representing playback options of fragments for the live football game and advertisement content for client devices in Washington. Due to the device constraints of client devices 102*a*-102*c*, the client manifest data received by client devices 102*a*-102*c* encompass a broader classification of client device (e.g., geographic location) compared to client manifest data received by client device 103. For example, client device 103 receives personalized manifest data particular to client device 103 (generated by manifest server 110), which includes playback options for advertisement fragments targeting the individual watching at client device 103.

Manifest services generate different versions of client manifest data. Client manifest data includes standard live client manifest data and client manifest data converted to VOD-style client manifest data for client devices that cannot playback content using standard live client manifest data. For example, manifest service 105*a* creates client manifest data (converted from standard live manifest data to VOD-style manifest data) with advertisement content for client devices streaming in Seattle, Wash., and manifest service 105*b* creates different manifest data with advertisement content for client devices streaming in Omaha, Nebr. Alternatively, the client manifest data provided to some of the client devices includes standard live manifest data that are not converted to VOD-style manifest data. Client device 102*b* uses the manifest data to request fragments from CDN 104.

Each encoder and packager combination is configured to encode a different version of the content to be consumed by devices corresponding to a specific device characteristic or set of device characteristics. For example, packager 106*a* and encoder 108*a* are configured to generate a version of the content for client devices from Nebraska. Likewise, packager 106*b* and encoder 108*b* are configured to generate a version of the content for client devices from Washington.

Manifest server 110 identifies root manifest data 122, which includes URLs representing live content fragments encoded by live encoder 114. Advertisement exchange server 111, which is controlled by a third party provider, provides advertisement content corresponding to the different device characteristics. The advertisement content is stored in database 112*b* for retrieval by manifest server 110. Manifest server 110 then generates different versions of server manifest data corresponding to different device characteristics (e.g., server manifest data 120*a* and 120*b*). After generating the server manifest data, manifest server 110 provides server manifest data 120*a* to encoder 108*a* and provides server manifest data 120*b* to encoder 108*b*. Each version of the server manifest data includes URLs to the live content and URLs to advertisement content selected based on the corresponding device characteristic. The URLs point to fragments stored in different locations depending on whether the fragments are advertisement content or live content. For example, source advertisement fragments 128*a* are stored in database 112*a*, and source live content fragments 128*b* are stored in database 112*b*.

Encoders 108*a* and 108*b* request source advertisement fragments 128*a* and source live content fragments 128*b* according to their respective version of server manifest data. For example, broadcast content source 116 is a live broadcast source for the football game. Broadcast content source 116 is delivered to live encoder 114, which encodes source live content fragments 128*b* and stores them in database 112*a*. Encoders 108*a* and 108*b* request source live content fragments 128*b* and source advertisement fragments 128*a* and re-encodes source advertisement fragments 128*a* and source live content fragments 128*b* according to variable bitrate encoding techniques to generate a variety of playback options for each fragment. Packagers 106*a* and 106*b* package the encoded fragments for the appropriate content version, for instance, fragments 126*a* and 126*b*, and deliver the fragments to CDN 104. Advertisement fragment 126*a* is delivered to client device 102*a* for Nebraska client devices, and advertisement fragment 126*b* is delivered to client devices 102*b* and 102*c* for Washington client devices, while dynamically inserted fragment 124 (representing personalized advertisement content based on the user's consumer habits) is delivered to client device 103. In this way, targeted advertisement content can be delivered to each client device whether or not the client device supports dynamic fragment insertion.

Figure 2:
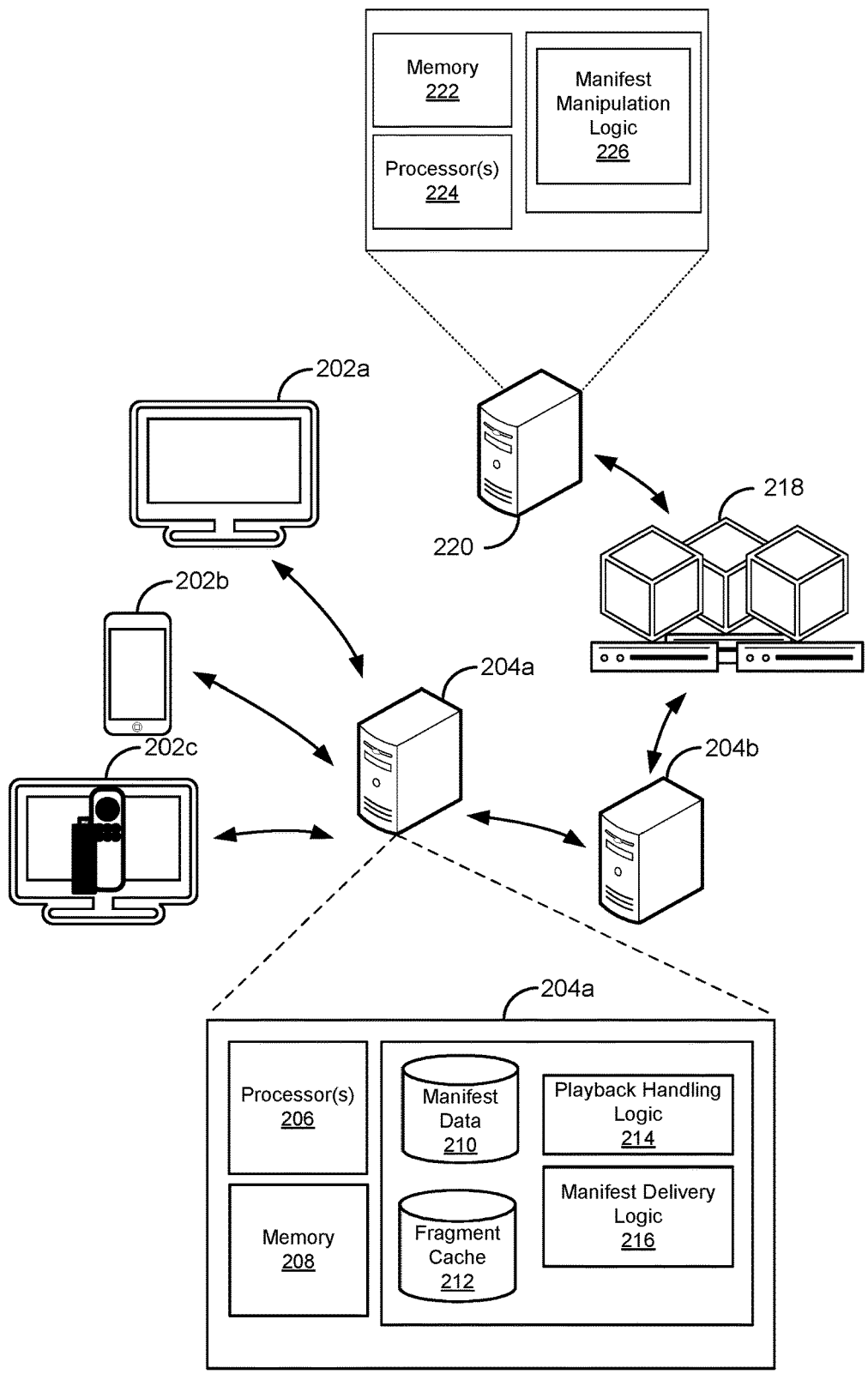
FIG. 2 is a simplified diagram of an example of a network computing environment in which various implementations may be practiced.

FIG. 2 illustrates an example of a computing environment fragment insertion for live media streaming. The computing environment of FIG. 2 includes origin server 204*b* that receives encoded media content and manifest data from encoder-packager combination 218. Origin server 204*b* provides the fragments and manifest data to edge server 204*a* and many other edge servers. Edge server 204*a* provides the manifest data and fragments to client devices 202*a-c*. Client devices 202*a-c* decode the encoded media content for playback on a display screen.

Edge server 204*a* and/or origin server 204*b* may be part of a content delivery system that conforms to any of a wide variety of architectures. The functionality and components of edge server 204*a* and/or origin server 204*b* can be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of CDNs, etc. The functionality described herein also may be implemented by one or more of different entities. For example, the functionality to provide playback of media content might be integrated into a video player or software client under control of one entity (e.g., on client devices 202*a-c*), integrated into a separate application from another entity, implemented in an edge server or content server of a CDN, a server of an ISP, etc.

In FIG. 2, client device 202*a* is a smart TV, client device 202*b* is a smartphone device, and client device 202*c* is a TV and media player stick. In addition, related functionality may also be implemented within tablets, wearable devices, virtual or augmented reality headsets, video game consoles, etc. Some or all of client devices 202*a*-202*c* may not support dynamic fragment insertion (e.g., older Smooth Streaming client devices only capable of VOD playback), discussed further above.

Edge server 204*a* includes one or more processor circuits 206, memory 208, and other hardware components to provide the encoded media content to client devices 202*a-c*. For example, processor circuits 206 execute stored instructions in memory 208 of edge server 204*a* to implement delivery techniques disclosed herein. It should be noted that, while processor circuits 206, memory 208, manifest database 210, media fragment cache 212, logic 214, and 216 are contemplated as integrated with edge server 204*a*, implementations are contemplated in which some or all of their respective functionality is implemented independently of edge server 204*a*.

In FIG. 2, edge server 204*a* includes various types of logic to identify device characteristics and provide fragments to client devices 202*a-c*. For example, edge server 204*a* includes playback handling logic 214 to process fragment requests and provide proper playback metadata to client devices 202*a-c*. Manifest delivery logic 216 identifies client manifest data with playback options for advertisement content associated with device characteristics, as well as client manifest data with playback options for dynamically inserted advertisement content. In addition, manifest delivery logic 216 will periodically identify and provide a refresh or update for live manifest data to clients currently streaming live content. After receiving manifest data via encoder-packager 218, an encoder, a packager, and/or a manifest service (e.g., manifest service 105*a-b* of FIG. 1), the manifest data is stored in memory such as a local buffer and/or cache, memory 208 or among manifest database 210.

Encoder-packagers(s) 218 can be implemented using one or both of software and hardware components. For example, multiple instances of encoder-packager 218 may be configured to encode fragments for each advertisement (e.g., advertisements for the state of Washington, California, Nebraska, etc.) corresponding to a device characteristic. Encoders can also be pooled together to balance the encoding load for live content fragments, e.g., four encoders divide the encoding work for the live football game, while they still encode their own particular advertisement fragments. Fragments of media content are encoded at various bitrates using a variety of variable bitrate encoding techniques, for instance, single-pass encoding, multi-pass encoding, constrained variable bitrate encoding, content type variable bitrate encoding, and any other lossless and/or lossy encoding technique that meets an encoding standard, e.g. High Efficiency Video Coding (HEVC/H.265). This and other examples described herein assume the use of H.265 encoding for live media content. However, it will be understood that the basic principles described herein may be employed with any of a variety of video and audio transcoding techniques, for instance, H.264.

Manifest server 220 includes one or more memory 222, processor circuits 224, and other hardware components to identify and provide server manifest data to encoder-packager 218. Server 220 uses manifest logic 226 to identify source live content fragments and source advertisement fragments stored in different locations. Manifest logic 226 also includes a variety of rules configured by an administrator that correspond to particular device characteristics and trigger a response to generate server manifest data. For example, server 220 uses a rule associated with client devices requesting playback from Nebraska to generate server manifest data with URLs identifying advertisement content corresponding to client devices streaming in Nebraska.

Client devices 202a-c can also include various types of logic, for instance, decoder logic for decoding the encoded media content received from edge server 204a and playback handling logic to request playback of portions of media content. In addition, client devices 202a-c includes various types of memory to store and/or cache decoded media, one or more processors, and other hardware components to request and decode the encoded media content provided by edge server 204a. For example, the processors of client devices 202a-c execute stored instructions in memory to implement decoding techniques based on the encoding techniques disclosed herein.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling servers 204a and 204b. Alternatively, such resources may be independent of servers 204a and 204b, e.g., on a platform under control of a separate provider of computing resources with which servers 204a and 204b connects to consume computing resources as needed.

It should be noted that, despite references to particular computing paradigms and software tools herein, the computer program product and the computer program instructions on which various implementations disclosed herein are based may correspond to any of a wide variety of programming languages, software tools, and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Figure 3:
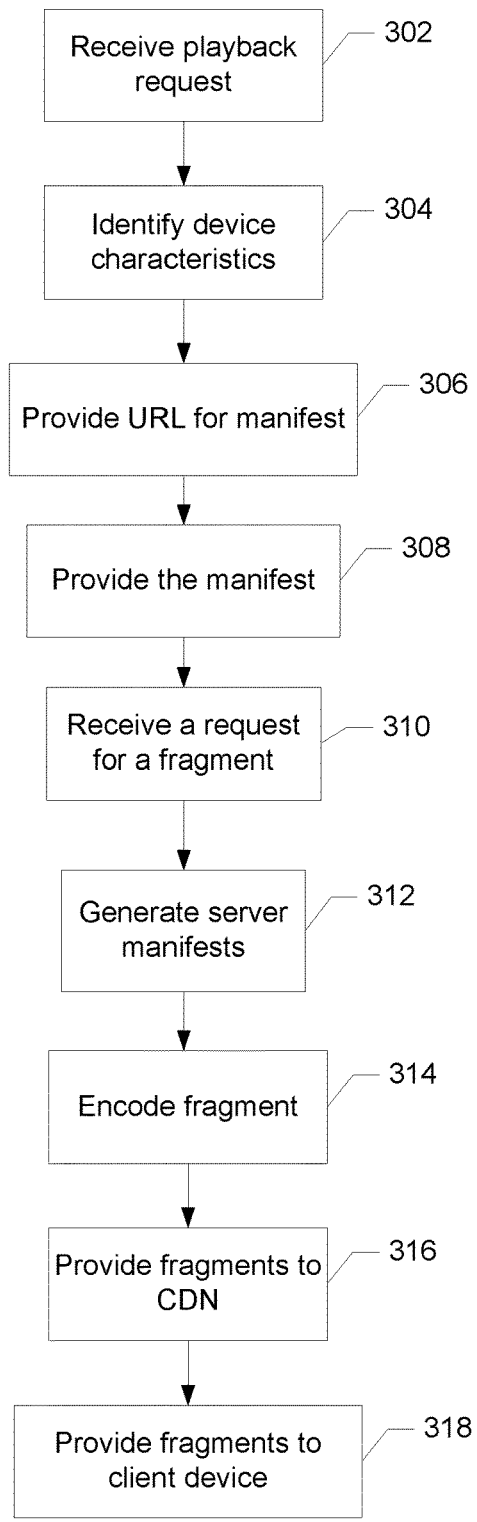
FIG. 3 is a flowchart illustrating operation of a particular implementation.

A specific implementation will now be described with reference to FIG. 1, the computing environment of FIG. 2, and the flow diagram of FIG. 3. To start streaming media content, a user selects media content for playback on a client device, for example, by selecting a live football game for from a video streaming service on their smart TV. The smart TV then sends a request (e.g., an HTTP request) for playback of the selected media content, and the request is received by a media server (302). Upon receiving the request of block 302, the media server identifies client manifest data corresponding to a device characteristic of the client device of block 302 (304). Identification of device characteristics for the purposes of requesting client manifest data might be made by any component of a CDN (e.g., an edge server), the client device, a separate component, or a combination thereof. For example, upon requesting playback of media content, a client device provides device characteristics to a playback resource service. The playback resource service may be responsible for determining whether a client device can access the live media content (e.g., the user of the client device is a subscribing customer) and for handling manifest requests from different types of devices (e.g., devices capable unconstrained fragment insertion and limited fragment insertion). A request to playback resource service includes a device characteristic. The playback resource service uses different rules configured by an administrator that correspond to different device characteristics. For example, one rule may be configured to identify client devices streaming in Nebraska, and the rule is configured to trigger a response to the client device with a URL for manifest data that is particular to client devices in Nebraska. The client device uses that URL to request the manifest data from the CDN. Rules can be based on a variety of device characteristics (discussed in detail further below) and are not limited returning manifest data URLs. For example, playback resource service might also include a rule for determining whether a client device is capable of dynamic fragment insertion. If so, the playback resource service would then identify either personalized manifest data (for unconstrained fragment insertion) URL, or if not, a manifest data URL based on the device characteristics and provide it to the CDN for delivery to the client device.

A variety of techniques may be used to identify a geographic location of a client device. For example, a client device's hostname and/or IP address (included in the request of block 302) can be analyzed to determine the location of the device. In this example, the hostname of a client device is "25-255-25-25.CA.Combcast.net." A media server could determine that the request came from a client device in California based on the "CA" in the hostname. Because ISPs tend to be limited to certain geographic bounds, the media server might also use "Combcast" as an indication of the geographic location of the client device. Depending on the granularity of the device characteristic, systems that are more sophisticated may also be employed to gather more refined information about the location of a client device. It will be understood by those skilled in the art that a variety of other identification techniques may be used to identify the geographic location of a client device. For example, GPS coordinates, user agent data or other data that can be found in a request header, customer information (e.g., address, zip code, etc.) associated with a user account used to login to a media streaming platform, etc.

Geographic location is one of a variety of device characteristics. Other device characteristics that might be used include, but are not limited to: brand of device, device type (mobile device or Smart TV), internet service provider, operating system, type of media content (e.g., live football game or live cooking show), content delivery network, customer preference (e.g., a user can select a customization setting that indicating specific types of advertisement content to receive), bandwidth range, time of the day, or the popularity of media content. In addition, device characteristics may vary according to different levels of specificity (e.g., a characteristic for a geographic location may be identified based on country, state, county, city, etc.). In general, devices may be identified and categorized according to any characteristics that facilitate the presenting the most relevant advertisement content to a particular group as enabled by the present disclosure.

The characteristics by which devices are identified are configurable in that device characteristics may be refined, changed, or adapted over time for a variety of reasons. For example, analysis of streaming sessions for viewers in Omaha, Nebr. could lead to these devices later being included in an identification of client devices located in the Midwestern United States. In another example, after receiving success rate metrics for advertisement content displayed for client devices from Nebraska, it can be determined that the advertisement content for 60,000 displayed on client devices from Omaha, Nebr. was unusually unsuccessful (e.g., the advertisement content had a 10% success rate throughout Nebraska compared to 1% for client devices in Omaha, Nebr.). This might indicate that the advertisement content is not sufficiently targeted to those devices. As a result, a new and more narrowly device characteristic (e.g., client devices in Omaha, Nebr.) might be used to identify those 60,000 devices.

In some implementations, device characteristics are identified each time a client device requests playback of media content. In other implementations, device characteristics may be stored at the CDN after an initial identification (e.g., a client device previously requested media content and identification of a device characteristic is made based on the previous request).

Returning to FIG. 3, the media server provides a manifest data URL associated with the identified device characteristics to the client device (306). The client device requests playback of the live content by sending the URL to an edge server of the CDN. The edge server responds to the request by providing client manifest data located at the URL (308). Client manifest data includes personalized manifest data for client devices that support dynamic fragment insertions, standard live manifest data corresponding to device characteristics for client devices that support live streaming with a live manifest, and VOD-style manifest data corresponding to device characteristics for client devices that do not support live streaming with live manifest data (discussed in further detail below). Manifest data includes metadata that allows client devices to generate properly formatted requests for specific fragments of media content. Different types manifest data are requested according to the type of adaptive bitrate streaming protocol used by the client device. Examples of adaptive bitrate streaming protocols include Microsoft Smooth Streaming, Dynamic Adaptive Streaming over HTTP (DASH), HTTP dynamic streaming, HTTP live streaming (HLS), etc. A smart TV with a media player using the DASH protocol will playback media content using manifest data that is particular to DASH. In contrast, another media player using the Smooth Streaming protocol will playback media content using manifest data particular to Smooth Streaming.

Some older media players do not support playback of live content through live manifest data. As a consequence, a manifest service can be used to convert standard live manifest data to a VOD-style manifest data that allows the unsupported media players to properly stream live content through the VOD-style manifest data. In one example, VOD-style manifest data is configured to provide fragments from predetermined locations for a fixed period of, e.g., 6 hours of media content playback can be mapped (live manifest data include locations dynamically generated as new fragments are encoded and do not have static end time). The manifest service converts, or maps, fragment locations and playback durations from live manifest data to VOD-style manifest data. As an illustration of the mapping process, VOD-style manifest data is configured to playback fragments at 2 second increments. The VOD-style manifest data also includes predetermined URLs for all 6 hours of the fragments. For example, for example the first 10 seconds of the VOD-style manifest data includes: "CDN\FootballGame\fga023_0001," "CDN\FootballGame\fga023_0002," "CDN\FootballGame\fga023_0003," "CDN\FootballGame\fga023_0004," and "CDN\FootballGame\fga023_0005." For the first 10 seconds of live content fragments to be mapped from the live manifest data to the VOD-style manifest data, the manifest service maps the locations of the fragments in the live manifest data to the predetermined URLs of the VOD-style manifest data. For example, the live manifest data may include the first two second fragment having a URL with an arbitrary location of "CDN\LiveContentABC\xidn1o10" with which the manifest service maps to "CDN\FootballGame\fga023_0001," allowing the older media player to properly identify live content fragments through VOD-style manifest data. For more information regarding specific techniques for generating VOD-style manifest data, please refer to U.S. patent application Ser. No. 15/190,037, filed on Jun. 22, 2016, the entire disclosure of which is incorporated herein by reference.

Returning to FIG. 3, a client device requests a fragment using client manifest data, and the request for the fragment is received by an edge server of the CDN (310). The client device requests fragments according to adaptive bit rate streaming techniques, which allows the client device to adjust the quality and/or bitrate of the fragment requested to account for changes in network conditions. In some implementations, live content fragments and advertisement content fragments (along with client manifest data) are pushed to the CDN as they are encoded in real-time. Alternatively, fragments may also be requested using pull requests by the CDN, e.g., for requesting advertisement fragments ahead of live content fragments.

In order to provide fragments in real-time to the CDN, multiple encoder and packager combinations are configured to encode and package different versions of the content. Each encoder requests fragments using server manifest data generated by a manifest server based on live content source fragments and advertisement source fragments corresponding to a device characteristic (312). For example, a manifest server identifies root manifest data for a live football game. Root manifest data includes a sequence of locations for live content fragments with some portions of the sequence designated for unspecified advertisement content to be inserted according to the various techniques described herein. The manifest server identifies advertisement content corresponding to different device characteristics that is to be included at the times designated for the advertisement content, e.g., an advertisement for corn that is targeted towards client devices streaming in Nebraska. The manifest server then generates different versions of server manifest data for the live football game. Each version of the server manifest data will include advertisement fragments corresponding to a device characteristic, discussed further above. For example, a version of server manifest data may include 10 seconds of the live football game and 30 seconds of the corn advertisement. In some implementations, server manifest data includes URLs to the live content at one storage location and URLs to advertisement content corresponding to the device characteristic at another location. The storage locations of the live media content may be controlled by a different provider than the storage locations of the advertisement media content.

As mentioned above, multiple encoder and packager combinations are configured to encode and package different versions of the live content to be consumed by devices corresponding to a specific device characteristic or set of device characteristics (314). Each encoder receives a version of the server manifest data from the manifest server. For example, an encoder encoding fragments for client devices in Washington would receive server manifest data for a live football game with advertisement content particular to Washington client devices. Encoders then request source fragments according to the server manifest data they received. In some implementations, source fragments are received from a third party advertisement provider. For example, a manifest server requests advertisement content from a third party advertisement provider, the advertisement provider provides the advertisement content from an advertiser that bids the most for the advertisement slot, which is then encoded and stored at a storage device particular to advertisement fragments. The encoder may request one of these advertisement source fragments using a URL provided in its server manifest data. Similarly, the encoder may use a URL to request a source fragment for live content fragments stored at a storage location specifically configured to store incoming live content fragments from a live encoder.

After receiving a source fragment, encoders encode, or re-encode, the fragments according to a set of parameters. For example, an encoder might receive source fragments encoded at different bitrates (e.g., 1920×1080 at 5,600 kbps vs 1920×1080 at 6,600 kbps) and for different durations (e.g., 6 seconds vs. 1 second). The encoder will encode each fragment (regardless of fragment type) according to variable bitrate encoding techniques, resulting in a variety of resolutions and bitrates (e.g., 848×480 at 1,600 kbps, 1280×720 at 2,500 kbps, 1920×1080 at 5,600 kbps, etc.) for each fragment. In addition, any arbitrary length of a source fragment would be re-encoded at a constant duration, such as 1-4 seconds. As such, an encoder can create a uniform set of fragments from source fragments that eliminates differences between encoding parameters used when the source fragments were encoded. A packager associated with a corresponding encoder will work in conjunction to package the fragments into an appropriate content version for delivery to client devices. The encoded fragments are then provided to the CDN (316), which are sent to the client devices requesting playback of the live media (318).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising:
  a manifest manipulation server configured to:
    receive root manifest data identifying live content fragments representing live content,
    identify first advertisement content fragments corresponding to a first device characteristic,
    generate first server manifest data based on the root manifest data and the first advertisement content fragments,
    provide the first server manifest data to a first encoder,
    identify second advertisement content fragments corresponding to a second device characteristic, the second advertisement content fragments being different than the first advertisement content fragments,
    generate second server manifest data based on the root manifest data and the second advertisement content fragments, and
    provide the second server manifest data to a second encoder;
  the first encoder configured to:
    request, using the first server manifest data, the live content fragments encoded according to a first set of parameters and the first advertisement content fragments encoded according to a second set of parameters, and
    encode a first live content version using the live content fragments and the first advertisement content fragments according to a third set of parameters;
  a first packager configured to:
    generate first client manifest data representing playback options for the first live content version, and
    provide the first live content version to a content delivery network for delivery to a first client device associated with the first device characteristic;
  the second encoder configured to:
    request, using the second server manifest data, the live content fragments and the second advertisement content fragments encoded according to a fourth set of parameters, and
    encode a second live content version using the live content fragments and the second advertisement content fragments according to the third set of parameters; and
  a second packager configured to:
    generate second client manifest data representing playback options for the second live content version, and
    provide the second live content version to the content delivery network for delivery to a second client device associated with the second device characteristic.

2. The system of claim 1, wherein the first device characteristic represents a geographic location, the geographic location being one of a country, a state, a province, or a city.

3. The system of claim 1, further comprising a playback resource server configured to:
  receive a request for playback of the live content from the first client device,
  identify the first device characteristic associated with the first client device,
  provide a first client manifest location to the first client device based on the first device characteristic,
  receive a request for playback of the live content from the second client device,
  identify the second device characteristic associated with the second client device, and
  provide a second client manifest location to the second client device based on the second device characteristic.

4. The system of claim 1, wherein the manifest manipulation server is further configured to:
  receive a request for the live content from a third client device,
  determine that the third client device is configured to use dynamic manifest data specific to the third client device, the dynamic manifest data representing playback options for a third live content version representing the live content and advertisement content targeting a user of the third client device,
  generate the dynamic manifest data, and
  provide the dynamic manifest data to the content delivery network for delivery to the third client device.

5. A system, comprising one or more computing devices configured to:
- receive primary content fragments representing primary content;
- receive root manifest data representing the primary content fragments;
- identify first secondary content fragments corresponding to a first device characteristic;
- generate first server manifest data representing a sequence of the primary content fragments and the first secondary content fragments;
- request the primary content fragments and the first secondary content fragments using the first server manifest data;
- encode a first content version using the primary content fragments and the first secondary content fragments;
- generate first client manifest data representing playback options for the first content version;
- identify second secondary content fragments corresponding to a second device characteristic;
- generate second server manifest data representing a sequence of the primary content fragments and the second secondary content fragments;
- request the primary content fragments and the second secondary content fragments using the second server manifest data;
- encode a second content version using the primary content fragments and the second secondary content fragments; and
- generate second client manifest data representing playback options for the second content version.

6. The system of claim 5, wherein the one or more computing devices are further configured to:
- receive a first request for live content from a first client device corresponding to the first device characteristic;
- provide a first uniform resource locator (URL) for the first client manifest data to the first client device;
- receive a second request for the live content from a second client device corresponding to the second device characteristic; and
- provide a second URL for the second client manifest data to the second client device.

7. The system of claim 5, wherein the primary content fragments are encoded according a first set of parameters, the first secondary content fragments are encoded according to a second set of parameters, the second secondary content fragments are encoded according to a third set of parameters, the first content version encoded according to a third set of parameters, and the second content version encoded according to the third set of parameters.

8. The system of claim 5, wherein the one or more computing devices are further configured to:
- receive a request for live content from a third client device;
- determine that the third client device is configured to use dynamic manifest data specific to the third client device, the dynamic manifest data representing playback options for a third content version representing the primary content and advertisement content targeting a user of the third client device;
- generate the dynamic manifest data; and
- provide the dynamic manifest data to a content delivery network for delivery to the third client device.

9. The system of claim 5, wherein the first client manifest data is generated based on first standard live manifest data and the second client manifest data is generated based on second standard live manifest data, and wherein the first client manifest data represents first video-on-demand (VOD)-style manifest data and the second client manifest data represents second VOD-style manifest data.

10. The system of claim 9, wherein the first standard live manifest data includes playback options for the primary content fragments and the first secondary content fragments, and wherein the one or more computing devices are further configured to:
- receive a request for live content from a third client device corresponding to the first device characteristic;
- determine that the third client device is configured to use standard live manifest data; and
- provide the first standard live manifest data to a content delivery network for delivery to the third client device.

11. The system of claim 5, wherein the first device characteristic represents a device type, a communication connection, or a geographic location, the geographic location being one of a country, a state, a province, or a city.

12. The system of claim 5, wherein the primary content fragments represent live media content, the first secondary content fragments represent advertisement content corresponding to the first device characteristic, and the second secondary content fragments represent advertisement content corresponding to the second device characteristic.

13. A computer-implemented method, comprising:
- receiving primary content fragments representing primary content;
- receiving root manifest data representing the primary content fragments;
- identifying first secondary content fragments corresponding to a first device characteristic;
- generating first server manifest data representing a sequence of the primary content fragments and the first secondary content fragments;
- requesting the primary content fragments and the first secondary content fragments using the first server manifest data;
- encoding a first content version using the primary content fragments and the first secondary content fragments;
- generating first client manifest data representing playback options for the first content version;
- identifying second secondary content fragments corresponding to a second device characteristic;
- generating second server manifest data representing a sequence of the primary content fragments and the second secondary content fragments;
- requesting the primary content fragments and the second secondary content fragments using the second server manifest data;
- encoding a second content version using the primary content fragments and the second secondary content fragments; and
- generating second client manifest data representing playback options for the second content version.

14. The method of claim 13, further comprising:
- receiving a first request for live content from a first client device corresponding to the first device characteristic;
- providing a first uniform resource locator (URL) for the first client manifest data to the first client device;
- receiving a second request for the live content from a second client device corresponding to the second device characteristic; and
- providing a second URL for the second client manifest data to the second client device.

15. The method of claim 13, wherein the primary content fragments are encoded according a first set of parameters, the first secondary content fragments are encoded according to a second set of parameters, the second secondary content fragments are encoded according to a third set of parameters, the first content version encoded according to a third set of parameters, and the second content version encoded according to the third set of parameters.

16. The method of claim 13, further comprising:
receiving a request for live content from a third client device;
determining that the third client device is configured to use dynamic manifest data specific to the third client device, the dynamic manifest data representing playback options for a third content version representing the primary content and advertisement content targeting a user of the third client device;
generating the dynamic manifest data; and
providing the dynamic manifest data to a content delivery network for delivery to the third client device.

17. The method of claim 13, wherein the first client manifest data is generated based on first standard live manifest data and the second client manifest data is generated based on second standard live manifest data, and wherein the first client manifest data represents first video-on-demand (VOD)-style manifest data and the second client manifest data represents second VOD-style manifest data.

18. The method of claim 17, wherein the first standard live manifest data includes playback options for the primary content fragments and the first secondary content fragments, the method further comprising:
receiving a request for live content from a third client device corresponding to the first device characteristic;
determining that the third client device is configured to use standard live manifest data; and
providing the first standard live manifest data to a content delivery network for delivery to the third client device.

19. The method of claim 13, wherein the first device characteristic represents a device type, a communication connection, or a geographic location, the geographic location being one of a country, a state, a province, or a city.

20. The method of claim 13, wherein the primary content fragments represent live media content, the first secondary content fragments represent advertisement content corresponding to the first device characteristic, and the second secondary content fragments represent advertisement content corresponding to the second device characteristic.

* * * * *